(12) United States Patent
Ogawa

(10) Patent No.: US 7,333,006 B2
(45) Date of Patent: Feb. 19, 2008

(54) VEHICLE DRIVING SUPPORT DEVICE WITH FACE DIRECTION ALIGNING

(75) Inventor: Kenichi Ogawa, Kariya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 187 days.

(21) Appl. No.: 11/337,545

(22) Filed: Jan. 24, 2006

(65) Prior Publication Data
US 2006/0165259 A1    Jul. 27, 2006

(30) Foreign Application Priority Data
Jan. 27, 2005    (JP)    ............... 2005-019021

(51) Int. Cl.
*B60Q 23/00*    (2006.01)
(52) U.S. Cl. ...................... 340/438; 382/104
(58) Field of Classification Search ................ 340/438, 340/436, 901, 903, 3.41; 348/148; 382/104
See application file for complete search history.

(56) References Cited

U.S. PATENT DOCUMENTS 5,629,669 A * 5/1997 Asano et al. ............... 340/436
6,496,117 B2 * 12/2002 Gutta et al. ................. 340/576
2004/0178890 A1    9/2004 Williamns et al.
2004/0239509 A1    12/2004 Kisacanin et al.

FOREIGN PATENT DOCUMENTS

| JP | 2822508 | 9/1998 |
|---|---|---|
| JP | 2000-339476 A | 12/2000 |
| JP | 2001-283381 A | 10/2001 |

* cited by examiner

*Primary Examiner*—Jeffery Hofsass
*Assistant Examiner*—Sigmund Tang
(74) *Attorney, Agent, or Firm*—Sughrue Mion, PLLC

(57) ABSTRACT

A vehicle driving support device provided at a first vehicle and a second vehicle respectively so as to be paired in order to set off an alarm includes an image input means, a face angle detecting means, a traveling direction detecting means, a face direction detecting means, an inter vehicle communicating means a determining means and a warning means for setting off an alarm when the determining means determines that the face direction of the first driver and the face direction of the second driver are not aligned.

11 Claims, 4 Drawing Sheets

VEHICLE DRIVING SUPPORT DEVICE WITH FACE DIRECTION ALIGNING

CROSS REFERENCE TO RELATED APPLICATIONS

This application is based on and claims priority under 35 U.S.C. § 119 to Japanese Patent Application 2005-019021, filed on Jan. 27, 2005, the entire content of which is incorporated herein by reference.

FIELD OF THE INVENTION

The present invention generally relates to a vehicle driving support device for setting off an alarm to a driver of a vehicle on the basis of an inter communication between one vehicle and the other vehicle.

BACKGROUND

A known driving support device for setting off an alarm to a driver of a vehicle disclosed in JP2822508B2 proposes a driving condition detecting device. Specifically, the driving condition detecting device sets a standard direction at which the driver's face is supposed to be, and detects an actual direction of the driver's face. Further, the driving condition detecting device detects an angle between the standard direction and the actual direction and determines whether or not the detected angle is acceptable.

Further, a device for detecting a location of eyes and a location of the face is disclosed in JP2000-339476A, and such device detects an edge image from an image in which a user is captured by a TV camera and obtains a central line of the face from the image of the face and the edge image. On the basis of the detected centerline, areas of face parts are determined, and further, the face image is divided into a left-eye area, a right-eye area and a nose area. The device further detects locations of the eyes in the face image and the edge image within each of the areas.

Further, an inter vehicle communicating system disclosed in JP2001-283381A exchange information among plural vehicles. Specifically, the system includes a driving supporting camera mounted to a user's vehicle in order to capture an image around the user's vehicle, and on the basis of the captured image, driving related information such as a traffic situation around the user's vehicle are detected, and such information is transmitted to another vehicle by a wireless method.

As described above, the driving support device disclosed in JP2822508B2 detects a direction of the driver's face, detects a face angle and determines whether or not the face angle is in a tolerance level. The device sets off an alarm to a driver of a vehicle on the basis of the angle, however, not on the basis of a relationship between the user's vehicle and the vehicle coming from the opposite direction. Further, the device sets off an alarm at frequent intervals, and this may annoy the driver.

In the same manner, the central line of the face obtained by the device disclosed in JP2000-339476A is not related to the vehicle coming from the opposite direction.

On the other hand, when the user's vehicle faces the vehicle coming from the opposite direction and the user's vehicle, which is temporally in a stopped state, starts traveling, a collision can be avoided if each of the drivers positioned in a face-to-face state so as to be able to communicate each other, however there is no means to confirm such condition so far, and the drivers cannot communicate each other with an eye contact and that may result in a collision. A method disclosed in JP2001-283381A transmits information such as traffic situation around the user's vehicle, which is captured by such as a driving support camera, by means of a wireless method. However, because such driving support camera is provided in order to capture the image of surroundings of the user's vehicle, not the face image of the driver, such means works without regard to any reference in behaviors of the drivers of each vehicle.

A need thus exists to provide a vehicle driving support device that sets off an alarm on the basis of an information exchanged between one vehicle and the other vehicle so that each of the drivers confirms that they are in a face-to-face situation.

SUMMARY OF THE INVENTION

According to an aspect of the present invention, a vehicle driving support device provided at a first vehicle and a second vehicle respectively so as to be paired in order to set off an alarm on the basis of information exchanged between the first vehicle and the second vehicle includes an image input means provided at the front of a first driver of the first vehicle for inputting an image including the first driver's face or provided at the front of a second driver of the second vehicle for inputting an image including the second driver's face, a face angle detecting means for detecting a face angle of the first driver on the basis of the image including the first driver's face inputted by the image input means or detecting a face angle of the second driver on the basis of the image including the second driver's face inputted by the image input means, a traveling direction detecting means detecting a traveling direction of the first vehicle or detecting a traveling direction of the second vehicle, a face direction detecting means for detecting a face direction of the first driver on the basis of the traveling direction of the first vehicle detected by the traveling direction detecting means and the face angle of the first driver detected by the face angle detecting means or detecting a face direction of the second driver on the basis of the traveling direction of the second vehicle detected by the traveling direction detecting means and the face angle of the second driver detected by the face angle detecting means, an inter vehicle communicating means for exchanging information between the first vehicle and the second vehicle, the information including a signal indicating the face direction of the first driver detected by the face direction detecting means and a signal indicating the face direction of the second driver detected by the face direction detecting means, a determining means for comparing the signal indicating the face direction of the first driver and the signal indicating the face direction of the second driver inputted by the inter vehicle communicating means, and determining whether or not the first driver of the first vehicle faces the second driver of the second vehicle, and further determining the face direction of the first driver is aligned with the face direction of the second driver; and a warning means for setting off an alarm when the determining means determines that the face direction of the first driver and the face direction of the second driver are not aligned.

According to a second aspect of the present invention, a vehicle driving support device provided at a vehicle performing an information exchange between the vehicles including an image input means for inputting an image including the driver's face of the vehicle, a face angle detecting means for detecting a face angle of the driver on the basis of the image, a traveling direction detecting means detecting a traveling direction of the vehicle, a face direction detecting means for detecting a face direction of the driver on the basis of the traveling direction and the face angle, an inter vehicle communicating means for exchanging information between the vehicles for the information including the face direction of the driver, a determining means for comparing the signal indicating the face direction of the driver and the signal indicating a face direction of a driver of the other vehicle and determining whether or not the driver of the vehicle faces a driver of the other vehicle, and further determining the face direction of the driver is aligned with the face direction of the other driver; and a warning means for setting off an alarm when the determining means determines that the face direction is not aligned.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
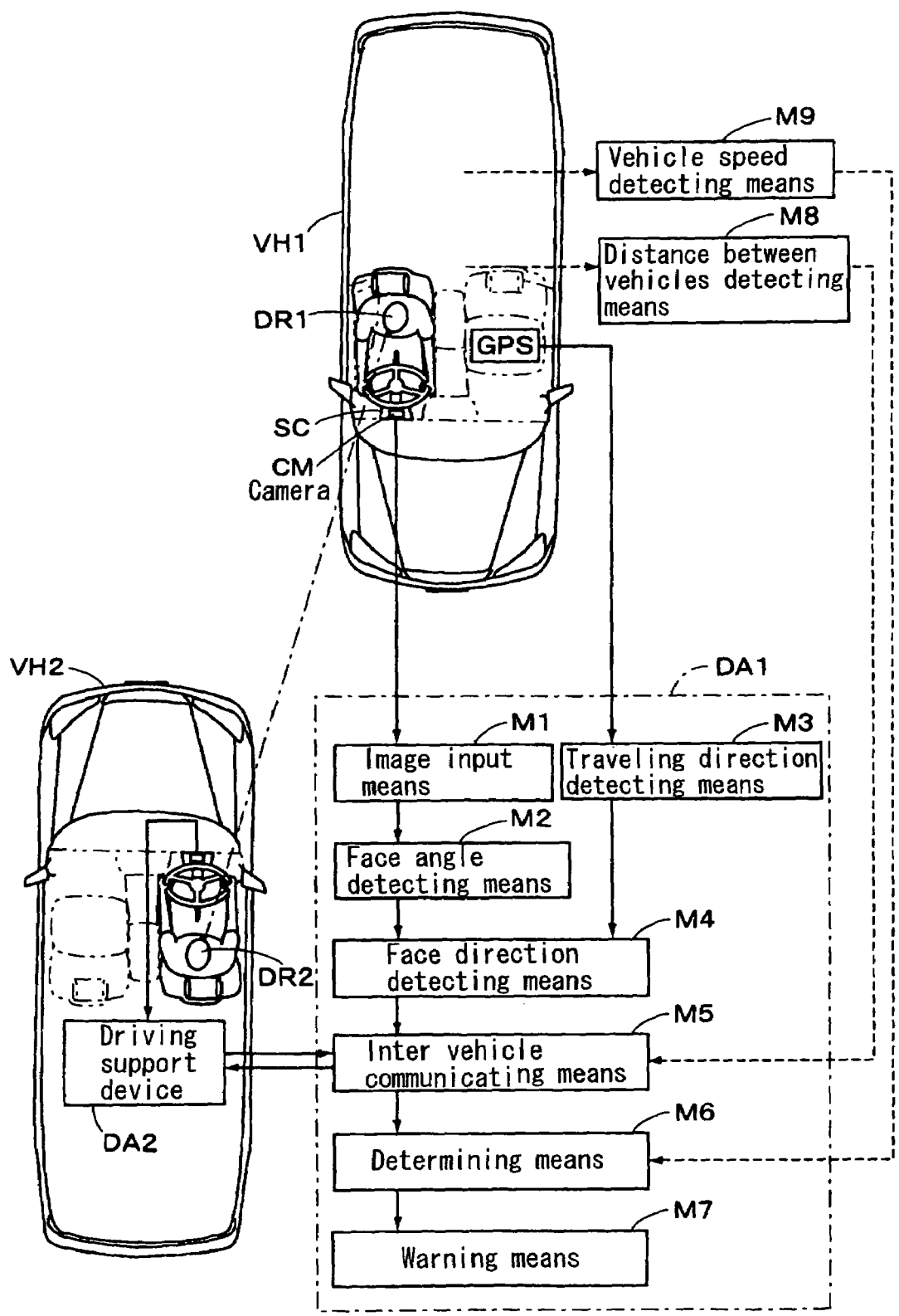
FIG. 1 illustrates a block diagram indicating a configuration of a vehicle driving support device of an embodiment according to the present invention.

An embodiment of a vehicle driving support device according to the present invention will be explained in accordance with the following drawings. FIG. 1 illustrates a first vehicle VH1 including a driving support device DA1 and a second vehicle VH2 including a driving support device DA2. Because the driving support device DA2 has the same configuration as the driving support device DA1, only a configuration of the driving support device DA1 will be explained thereinafter. Specifically, the driving support device DA1 includes an image input means M1, a face angle detecting means M2, a traveling direction detecting means M3, a face direction detecting means M4, an inter vehicle communicating means M5, a determining means M6, a warning means M7. More specifically, the image input means M1 is provided at the front of a first driver DR1 in the first vehicle VH1 in order to input an image including the first driver DR1. The face angle detecting means M2 detects a face angle of the first driver DR1 on the basis of the face image of the first driver DR1 inputted by the image input means M1. The traveling direction detecting means M3 detects a traveling direction of the first vehicle VH1. The face direction detecting means M4 for detecting a face direction of the first driver DR1 on the basis of the face angle of the first driver DR1 detected by the face angle detecting means M2, and the traveling direction of the first vehicle VH1 detected by the traveling direction detecting means M3.

The inter vehicle communicating means M5 exchanges the information between the first vehicle VH1 and the second vehicle VH2, the information including a signal indicating the face direction of the first driver DR1 detected by the face direction detecting means M4 and a signal indicating a face direction of the second driver DR2 detected by a face direction detecting means M4 of the driving support device DA2. The determining means M6 compares the signal indicating the face direction of the first driver DR1 in the first vehicle VH1 to the signal indicating the face direction of the second driver DR2 inputted by the inter vehicle communicating means M5. On the basis of the comparison result, it is determined whether or not the first driver DR1 of the first vehicle VH1 faces the second driver DR2 of the second vehicle VH2, and the face direction of the first driver DR1 is aligned with the face direction of the second driver DR2. When the determining means M6 detects that the face direction of the first driver DR1 is not aligned with the face direction of the second driver DR2, the warning means M7 sets off an alarm to the first driver 1.

The image input means M1 includes a capturing means such as a CCD camera CM (hereinbelow referred to as a camera CM), which is illustrated in FIG. 1. Specifically, the camera CM is fixed to a steering column SC in order to continually capture the face image of the first driver DR1. The place where the camera CM is fixed to is not limited to a steering column SC and the camera CM may be fixed to another place, for example, an instrument panel (not shown) as far as it can capture the face image of the first driver DR continually. The traveling direction detecting means M3 includes a GPS (global positioning system), which is used by a navigation system, for outputting a signal indicating a traveling direction of the first vehicle VH1.

In this embodiment, the driving support device DA1 further includes a distance between vehicles detecting means M8 for detecting a distance between the first vehicle VH1 and the second vehicle VH2. Thus, the inter vehicle communicating means M5 inputs a signal, which indicates a face direction of the first driver DR only when a distance detected by the distance between vehicles detecting means M8 is less than a predetermined distance. The driving support device DA1 further includes a vehicle speed detecting means M9 for detecting a vehicle speed of the first vehicle VH1, and it is determined whether or not the face direction of the first driver DR1 is aligned with the face direction of the second driver DR2 only when the vehicle speed of the first vehicle is less than a predetermined speed. The distance between vehicles detecting means M8 includes various devices such as a distance-surveying sensor using a laser beam, and the vehicle speed detecting means M9 may estimate the vehicle speed on the basis of a signal detected by a known vehicle wheel speed sensor.

Figure 2:
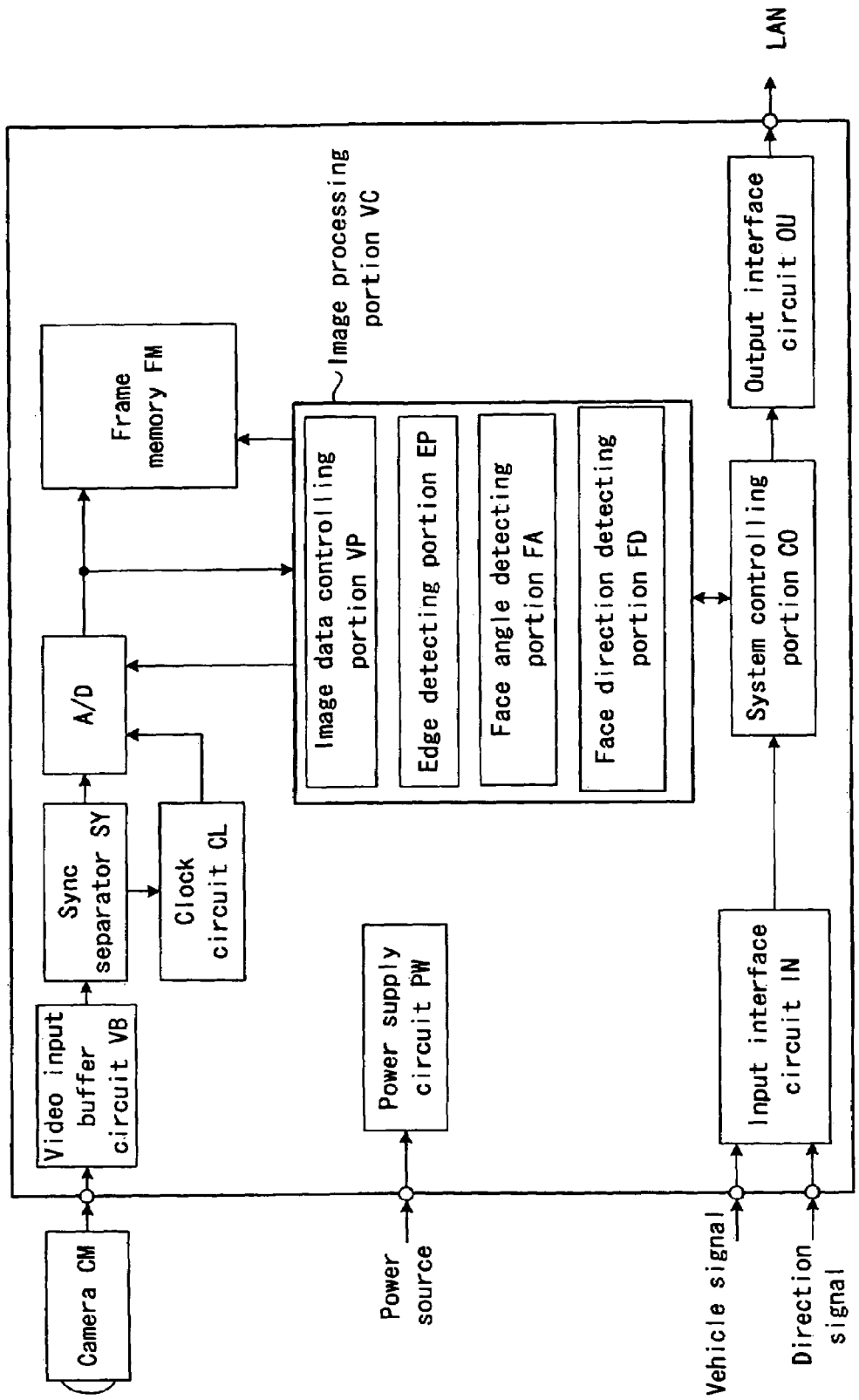
FIG. 2 illustrates a block diagram indicating a main configuration of each means related to an image processing in the embodiment according to the present invention.

FIG. 2 illustrates an example of configurations of means relates to the image processing. First, the image signal from the camera CM transmits through the video input buffer circuit VB and the sync separator SY, and then stored in a frame memory FM after A/D converted. The image data stored in the frame memory FM is processed in an image processing portion VC. In this embodiment, the image processing portion VC (serving as an image processing means) includes an image data controlling portion VP, an edge detecting portion EP, a face angle detecting portion FA and a face direction detecting portion FD.

In the image processing portion VC, data that is addressed by the image data controlling portion VP is read from the image data date stored in the frame memory FM. Further, in the edge detecting portion EP, an edge is detected by means of, for example a sobel operator, from the addressed data. In the face angle detecting portion FA, on the basis of the coordinates of edge, a probable line is selected as a width of a face and it is recognized as a face line. Thus, data related to the width of the face is determined. Further, on the basis of the data related to the width of the face, a searching area, in which facial parts exist, is determined. Furthermore, when a series of edge points, which continues in a horizontal direction within the searching area, is detected, facial parts are determined. On the basis of the facial part, a central location of the first driver DR1 (or the second driver DR2) is determined.

Further, a direction signal outputted from the GPS shown in FIG. 2, and output signals transmitted from the distance between vehicles detecting means M8 and the vehicle speed detecting means M9 (illustrated as a vehicle signal in FIG. 1) are transmitted to a system controlling portion CO (serving as a system controlling means) through the input interface circuit IN, the direction signal is transmitted to the image processing portion VC and used for calculating the face direction in the face direction detecting portion FD. Then, the result of the calculation in the face direction detecting portion FD is transmitted to the system controlling portion CO, and further transmitted to the output interface circuit OU. The output interface circuit OU outputs the result to the vehicle interior LAN. Through the vehicle interior LAN, the result is provided to the inter vehicle communicating means M5, the determining means M6 and the warning means M7. In FIG. 2, "CL" indicates a clock circuit, and "PW" indicates a power supply circuit.

Figure 3:
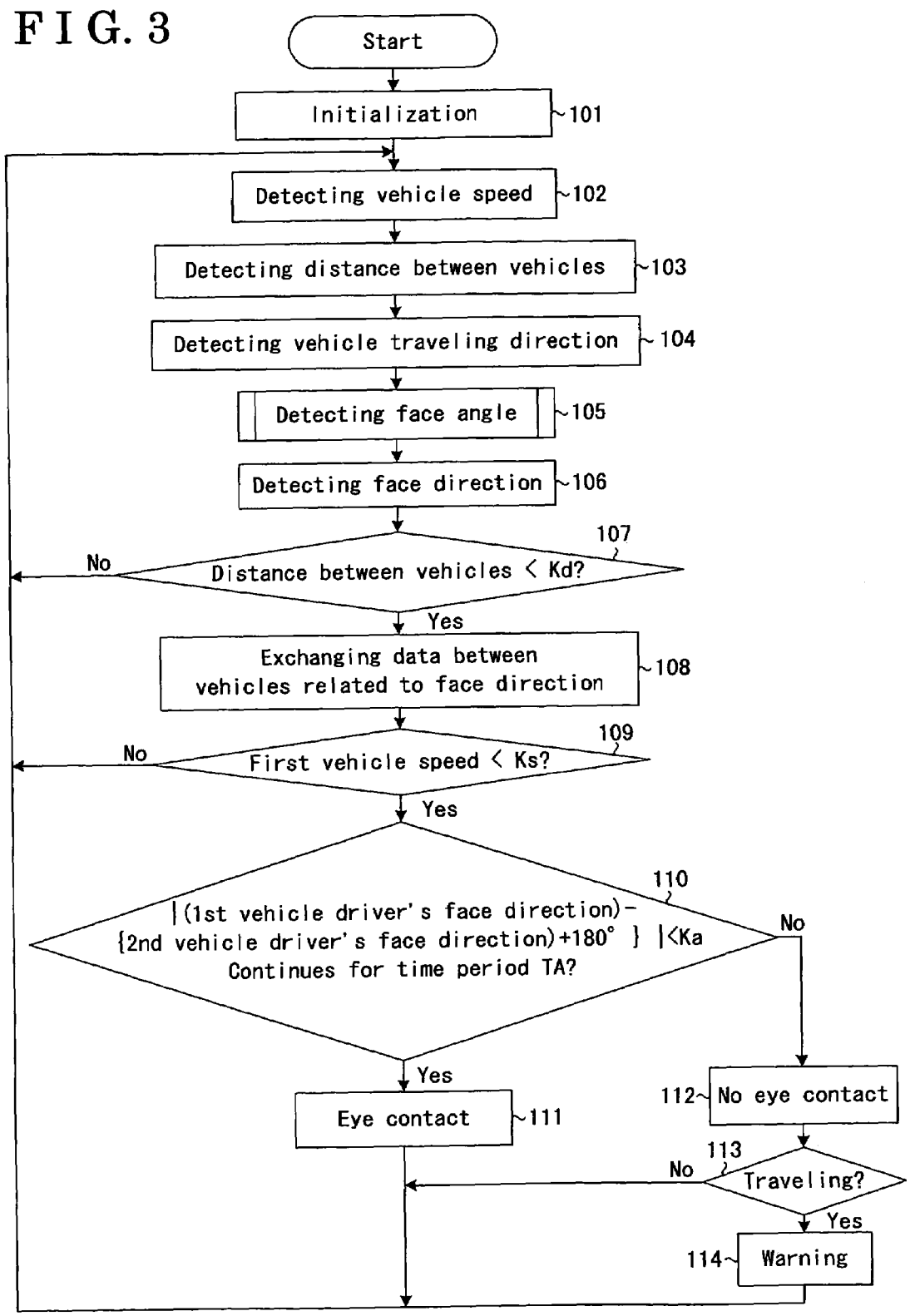
FIG. 3 illustrates a flow chart indicating a main routine in the embodiment according to the present invention.

FIG. 3 illustrates a flow chart of a main routine executed by the driving support device DA1 of the first vehicle VH1. The second driving support device DA2 of the second vehicle VH2 execute the same routine. In Step 101, initialization is executed, and the process goes to Step 102. In Step 102, the output signal from the vehicle speed detecting means M9 is inputted in the determining means M6, and then the process goes to Step 103. In Step 103, the output signal from the distance between vehicles detecting means M8 is inputted in the inter vehicle communicating means MS, and then the process goes to Step 104. In Step 104, the direction signal, which is detected by the traveling direction detecting means M3 and indicating the traveling direction of the first vehicle VH1, is inputted, and then the process proceeds to Step 105. In Step 105, a face angle of the first driver DR1 is detected.

Figure 4:
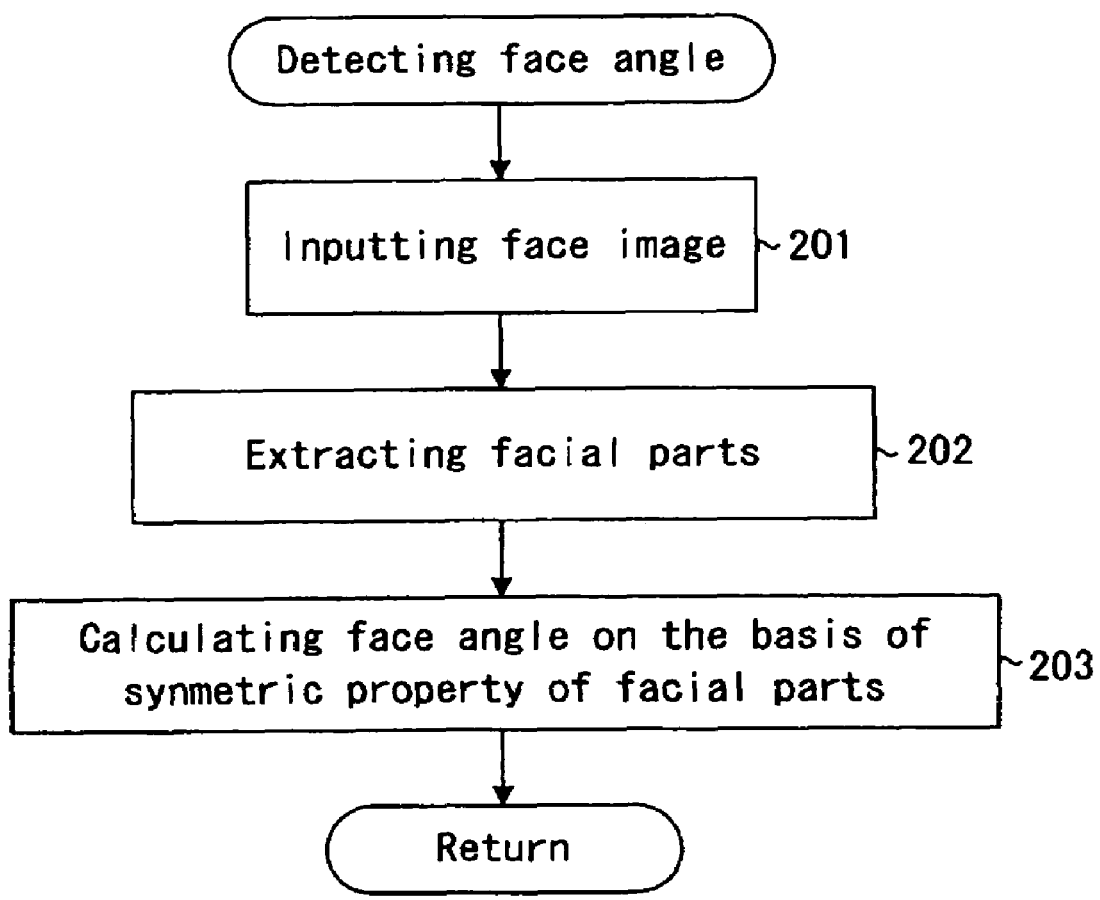
FIG. 4 illustrates a flow chart indicating a face angle detecting process shown in FIG. 3.

In Step 105, the face angle is detected following a flowchart illustrates in FIG. 4. Specifically, in Step 201, a face image of the first driver is inputted in image processing portion VC, and the process proceeds to Step 202. In step 202, a line of edge points continuously extending in a vertical direction is detected from the face image, and on the basis of the lines of edge points, data related to the width of the face is determined. Further, on the basis of the data related to the width of the face, a searching area, in which facial parts such as eyebrows exist, is determined. A line of edge points in a horizontal direction, which is detected within the searching area, is extracted as a facial part, and on the basis of positions of the facial parts, a central location of the first driver DR1 is calculated, and then the process goes to Step 203. In Step 203, a face angle is calculated on the basis of a symmetric property of the facial parts. Further, on the basis of the face angle calculated in Step 203 and the traveling direction of the first vehicle VH1 detected by the traveling direction detecting means M3, a face direction of the first driver DR1 is detected in Step 106. The face direction of the first driver DR1 is indicated by angle.

Then, the process goes to Step 107. In Step 107, a distance between the first vehicle VH1 and the second vehicle VH2 is compared to a predetermined distance Kd (m). If it is determined that the distance between the first vehicle VH1 and the second vehicle VH2 is less than the predetermined distance Kd, the process goes to Step 108 and exchange date related to the face direction with the second vehicle VH2, and then the process goes to Step 109. In Step 109, the vehicle speed of the first vehicle VH1 is compared to a predetermined speed Ks (Km/h). If it is determined that the vehicle speed of the first vehicle VH1 is less than the predetermined speed Ks, in other words, it is determined that the vehicle practically stops, the process goes to Step 110. In Step 110, it is determined whether or not the first driver DR1 of the first vehicle. VH1 faces the second driver DR2 of the second vehicle VH2, and the face direction of the first driver DR1 is aligned with the face direction of the second driver DR2. Specifically, in this embodiment, a differential between the face direction (angle) of the first vehicle VH1 and a value (e.g. angle) that is obtained by adding 180 degrees to the face direction of the second vehicle VH2 is calculated, and it is observed whether or not a condition where an absolute value of the above differential is less than a predetermined angle Ka has continued for a predetermined time period Ta, and when it is determined that the above condition continues for the predetermined time period Ta, it is determined that the face direction of the first driver DR1 is aligned with the face direction of the second driver DR2.

Then, the process goes to Step 110. In Step 110, if it is determined that the condition, in which the absolute value of the calculated difference value is less than a predetermined angle Ka, has continued for the predetermined time period Ta, the process goes to Step 111. In Step 111, it is determined that the face direction of the first driver DR1 is aligned with the face direction of the second driver DR2, in other words, it is determined that the first driver DR1 communicates with the second driver DR2 with an eye contact, and then the process goes back to Step 102. On the other hand, if it is determined that the condition, in which the absolute value of the calculated difference value is less than a predetermined angle Ka, has not continued for a predetermined time period Ta, the process goes to Step 112. In Step 112, it is determined that the face direction of the first driver DR1 is not aligned with the face direction of the second driver DR2, in other words, it is determined that the first driver DR1 does not communicate with the second driver DR2 with an eye contact, and then the process goes back to Step 113. In Step 113, it is determined whether or not the first vehicle VH1 is traveling. Specifically, it is determined whether or not the first vehicle VH1, which temporally stops, starts to travel. If it is determined that the vehicle is traveling, an alarm such as a voice signal, an alarm sound or an indicator lighting is set off. In this case, a throttle control device (not shown) can control the vehicle in order to limit the starting. Further, in Step 107, If it is not determined that the distance between the first vehicle VH1 and the second vehicle VH2 is less than the predetermined distance Kd, the process goes to Step 102 and above processes are repeated from Step 102 at a predetermined cycle. Further, in Step 109, If it is not determined that the vehicle speed of the first vehicle VH1 is less than the predetermined speed Ks, in other words, it is not determined that the vehicle practically stops, the process goes to Step 102 and above processes are repeated from Step 102 at a predetermined cycle. Furthermore, in Step 113, it is determined that the first vehicle VH1 is not traveling, the process goes to Step 102 and above processes are repeated from Step 102 at a predetermined cycle.

In this circumstance, the first driver DR1 can confirm easy and rapidly that the second driver DR2 is in a face-to-face condition relative to the first driver DR1, on the other hand, the second driver DR2 also can confirm easy and rapidly that the first driver DR1 is in a face-to-face condition relative to the second driver DR2. Further, an alarm is set off only when the distance between the first vehicle VH1 and the second vehicle VH2 are relatively short and the vehicle is traveling. Thus, chances that the alarm is set off frequently can be reduced.

A vehicle driving support device detects the face direction of the first driver on the basis of the vehicle traveling direction detected by the traveling direction detecting means and the face angle of the first driver detected by the face angle detecting means, and the signals indicating the face directions are exchanged between the first vehicle and the second vehicle by the inter vehicle communicating means, and the warning means sets off an alarm only when the drivers are in a face-to-face situation and the face direction of the first driver is aligned with the face direction of the second driver. Thus, each of the drivers can confirm the condition where the first vehicle faces to the second vehicle easily and rapidly.

Further, because the signal indicating the face direction of the driver is inputted only when the distance between the vehicles is less than the predetermined distance, the warning means sets off the alarm only when a collision about to occur. Furthermore, it is determined whether or not the face direction of the first driver is aligned with the face direction of the second driver only when the vehicle speed is less than the predetermined vehicle speed, the determination is executed only when the vehicle, which is temporally in a stopped state, starts traveling.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle driving support device provided at a first vehicle and a second vehicle respectively so as to be paired in order to set off an alarm on the basis of information exchanged between the first vehicle and the second vehicle comprising:
   an image input means provided at the front of a first driver of the first vehicle for inputting an image including the first driver's face or provided at the front of a second driver of the second vehicle for inputting an image including the second driver's face;
   a face angle detecting means for detecting a face angle of the first driver on the basis of the image including the first driver's face inputted by the image input means or detecting a face angle of the second driver on the basis of the image including the second driver's face inputted by the image input means;
   a traveling direction detecting means detecting a traveling direction of the first vehicle or detecting a traveling direction of the second vehicle;
   a face direction detecting means for detecting a face direction of the first driver on the basis of the traveling direction of the first vehicle detected by the traveling direction detecting means and the face angle of the first driver detected by the face angle detecting means or detecting a face direction of the second driver on the basis of the traveling direction of the second vehicle detected by the traveling direction detecting means and the face angle of the second driver detected by the face angle detecting means;
   an inter vehicle communicating means for exchanging information between the first vehicle and the second vehicle, the information including a signal indicating the face direction of the first driver detected by the face direction detecting means and a signal indicating the face direction of the second driver detected by the face direction detecting means;
   a determining means for comparing the signal indicating the face direction of the first driver and the signal indicating the face direction of the second driver inputted by the inter vehicle communicating means, and determining whether or not the first driver of the first vehicle faces the second driver of the second vehicle, and further determining the face direction of the first driver is aligned with the face direction of the second driver; and
   a warning means for setting off an alarm when the determining means determines that the face direction of the first driver and the face direction of the second driver are not aligned.

2. The vehicle driving support device according to claim 1, wherein one of the first vehicle and the second vehicle includes a distance between vehicles detecting means for detecting a distance between the first vehicle and the second vehicle, and on the basis of the distance between the first vehicle and the second vehicle, the inter vehicle communicating means inputs the signal indicating the face direction of one of the first driver or the second driver only when the distance between the first vehicle and the second vehicle is less than a predetermined distance.

3. The vehicle driving support device according to claim 2, wherein one of the first vehicle and the second vehicle includes a vehicle speed detecting means for detecting a vehicle speed of one of the vehicle having the vehicle speed detecting means, in order to determine whether or not the face directions of the first driver is aligned with the face direction of the second driver only when the speed detected by the vehicle speed detecting means is less than a predetermined vehicle speed.

4. The vehicle driving support device according to claim 1, wherein the face angle detecting means determines data related to a width of the face on the basis of edges detected in the image; determines a searching area, in which a facial part exists, on the basis of the data related to the width of the face; detects a series of edges, which continues in a horizontal direction within the searching area; and then detects a facial part.

5. The vehicle driving support device according to claim 1, wherein the face angle detecting means and the face direction detecting means are provided at an image processing means.

6. The vehicle driving support device according to claim 5 further including a system controlling means for inputting a direction signal outputted from a global positioning system and vehicle signals outputted from the distance between vehicles detecting means and the vehicle speed detecting means, wherein the system controlling means transmits the signals from the image processing means to a vehicle interior local area network.

7. The vehicle driving support device according to claim 1, wherein the face angle detecting means determines data related to a width of the face on the basis of a series of edges, which continues in a vertical direction, detected in the image; determines a searching area, in which a facial part exists, on the basis of the data related to the width of the face; detects a series of edges, which continues in a horizontal direction within the searching area; and then detects a facial part.

8. The vehicle driving support device according to claim 1, wherein the face direction detecting means detects the face direction of the first driver on the basis of the face angel of the first driver and the traveling direction of the first vehicle or detects the face direction of the second driver on the basis of the face angle of the second driver and the traveling direction of the second vehicle.

9. The vehicle driving support device according to claim 1, wherein the face direction detecting means determines, when the first vehicle is stopped, whether or not the first driver faces the second driver and whether or not the face direction of the first driver is aligned with the face direction of the second driver; or, when the second vehicle is stopped, whether or not the second driver faces the first driver and whether or not the face direction of the second driver is aligned with the face direction of the first driver.

10. The vehicle driving support device according to claim 1, wherein a differential between the face direction of the first vehicle and a value that is calculated by adding 180 degrees to the face direction of the second vehicle is calculated, and on the basis of whether or not a condition, in which an absolute value of the calculated differential is less than a predetermined angle, has continued for a predetermined time period, and thus it is determined whether or not the face direction of the first driver is aligned with the face direction of the second driver; or a differential between the face direction of the second vehicle and a value that is calculated by adding 180 degrees to the face direction of the first vehicle is calculated, and on the basis of whether or not a condition, in which an absolute value of the calculated differential is less than the predetermined angle, has continued for the predetermined time period, and thus it is determined whether or not the face direction of the second driver is aligned with the face direction of the first driver.

11. A vehicle driving support device provided at a vehicle performing an information exchange between the vehicles comprising:

an image input means for inputting an image including the driver's face of the vehicle;

a face angle detecting means for detecting a face angle of the driver on the basis of the image;

a traveling direction detecting means detecting a traveling direction of the vehicle;

a face direction detecting means for detecting a face direction of the driver on the basis of the traveling direction and the face angle;

an inter vehicle communicating means for exchanging information between the vehicles for the information including the face direction of the driver;

a determining means for comparing the signal indicating the face direction of the driver and the signal indicating a face direction of a driver of the other vehicle and determining whether or not the driver of the vehicle faces the driver of the other vehicle, and further determining the face direction of the driver is aligned with the face direction of the other driver; and a warning means for setting off an alarm when the determining means determines that the face direction is not aligned.

* * * * *